United States Patent [19]

Kondo et al.

[11] Patent Number: 4,677,160

[45] Date of Patent: Jun. 30, 1987

[54] METHOD FOR PRODUCING AN AQUEOUS SILICONE EMULSION COMPOSITION

[75] Inventors: Hidetoshi Kondo, Ichihara; Taro Koshii, Chiba, both of Japan

[73] Assignee: Toray Silicone Co., Ltd., Tokyo, Japan

[21] Appl. No.: 849,655

[22] Filed: Apr. 9, 1986

[30] Foreign Application Priority Data

Apr. 24, 1985 [JP] Japan .................................. 60-87845

[51] Int. Cl.$^4$ ............................................. C08L 83/04
[52] U.S. Cl. ..................................... 524/860; 524/859; 524/588; 524/401; 524/425; 524/432; 524/437; 524/445; 524/493; 528/15; 528/17; 528/18; 528/21; 528/19
[58] Field of Search ............... 524/859, 860, 588, 493, 524/437, 425, 432, 401, 445; 528/15, 17, 18, 19, 21

[56] References Cited

U.S. PATENT DOCUMENTS

| | | | |
|---|---|---|---|
| 4,221,688 | 9/1980 | Johnson et al. | 260/29.2 M |
| 4,427,811 | 1/1984 | Elias et al. | 524/96 |
| 4,559,056 | 12/1985 | Leigh et al. | 524/860 |
| 4,587,288 | 5/1986 | Maxson et al. | 524/860 |
| 4,590,220 | 5/1986 | Bauman et al. | 524/588 |

*Primary Examiner*—Melvyn I. Marquis
*Attorney, Agent, or Firm*—Edward C. Elliott

[57] ABSTRACT

According to the present invention, an aqueous silicone emulsion composition is produced as follows. A base emulsion is prepared from prescribed quantities of an essentially straight-chain organopolysiloxane with at least 2 silicon-bonded hydroxyl groups in each molecule, colloidal silica or alkali metal silicate, a curing catalyst, an emulsifier and water. After the pH is adjusted to 9 to 12 and ripened until an elastomer material is formed by the removal of water at room temperature, prescribed quantities of an epoxy-functional silane coupling agent or its partial hydrolysis product or its partial hydrolysis condensation product, a filler and a dispersant are added. The produced aqueous silicone emulsion composition bonds tightly to porous substrates in contact with it during curing and is therefore extremely useful as a coating or sealing material for various porous substrates.

5 Claims, 1 Drawing Figure

4,677,160

METHOD FOR PRODUCING AN AQUEOUS SILICONE EMULSION COMPOSITION

BACKGROUND OF THE INVENTION

1. Field of the Invention

The present invention describes a method for producing an aqueous silicone emulsion composition.

2. Background Information

Various aqueous silicone emulsion compositions yielding rubbery elastomers after the removal of water have been proposed or provided for the treatment of fiber and paper and for use as a waterproofing paint film for concrete, wood or slate, etc., based on the excellent water repellency, weather resistance and rubbery elasticity of silicones. For example, Japanese Kokai [Laid Open] Pat. No. 56-16553 [81-16553], equivalent to U.S. Pat. No. 4,221,688, issued Sept. 9, 1980, proposes an aqueous silicone emulsion composition which is principally composed of a hydroxyl-terminated diorganopolysiloxane, colloidal silica and an alkyltin salt. The addition of an extender filler to said emulsion composition produces a paint film material which readily gives a thick coat in a single application or produces a filler for cracks, gaps or joints, etc. Examples of the extender fillers which can be employed for this purpose are clay, aluminum oxide, quartz, calcium carbonate, zinc oxide and mica.

Japanese Kokai Pat. No. 58-118853 [83-118853], equivalent to U.S. Pat. No. 4,427,811, issued Jan. 24, 1984, describes an improved method for producing high-solids silicone elastomer emulsions.

As discussed above, it is known that thick-coating paints and caulks, etc., may be produced by the addition of an extender filler to an aqueous silicone emulsion in order to raise the solids content.

However, when an aqueous silicone emulsion composition containing a large quantity of filler in order to raise the solids content or viscosity is used as a sealing agent for filing gaps, joints, etc., the problem arises that it peels at the interface during the curing process, specifically from coated porous surfaces. This phenomenon is peculiar to porous surfaces and does not occur at flat smooth surfaces of metal, glass, etc. Since various porous materials such as mortar, slate and wood, etc., are used in civil engineering structures and buildings, it is very important that high-solids aqueous silicone emulsion compositions not peel from such porous materials.

Various methods were examined by the present inventors in order to eliminate the above-mentioned drawback to prior high-solids aqueous silicone emulsion compositions and the present invention was developed as a result. That is, the goal of the present invention is to provide a high-solids aqueous silicone emulsion composition which does not peel at the interface when applied to porous materials, either during or after the curing process.

SUMMARY OF THE INVENTION

A base emulsion is produced from an essentially straight chain polyorganosiloxane with at least two silicon-bonded hydroxyl groups in each molecule, colloidal silica or alkali metal silicate, curing catalyst, emulsifier and water. The base emulsion is adjusted to a pH of 9 to 12 and ripened until an elastomer is formed by the removal of water at room temperature. Then prescribed quantities of an epoxy-functional silane coupling agent or its partial hydrolysis product or its partial hydrolysis condensation product, a filler, and a dispersant are added. The aqueous silicone emulsion composition produced bonds tightly to porous substrates in contact with it during cure.

Figure 1:
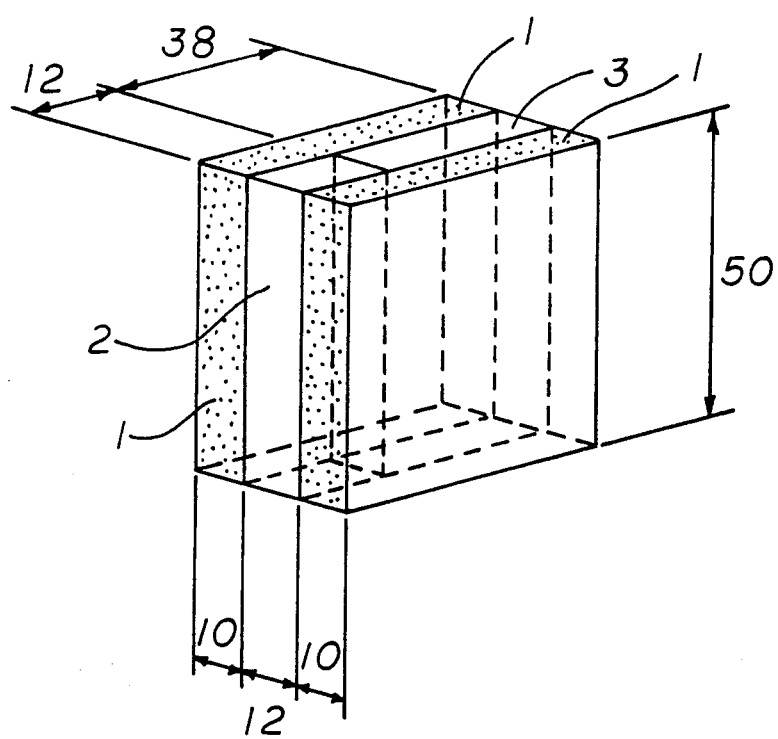
FIG. 1 is an oblique view of the test piece used for the evaluation of the adhesion of the aqueous silicone emulsion compositions. The dimensions in the figure is in millimeters.

Two mortar plates (1) are held apart with wood spacer (3) while aqueous silicone emulsion composition (2) is applied as indicated and allowed to dry.

DESCRIPTION OF THE INVENTION

Said goal of the present invention is achieved by a method for producing an aqueous silicone emulsion composition, characterized by producing a base emulsion from (A) 100 weight parts of an essentially straight-chain organopolysiloxane with at least 2 silicon-bonded hydroxyl groups in each molecule, (B) 1 to 150 weight parts colloidal silica or 0.3 to 30 weight parts alkali metal silicate, (C) a catalytic amount of a curing catalyst, (D) 2 to 30 weight parts emulsifier and (E) water, and, after adjusting the pH to 9 to 12 and ripening until the removal of water at room temperature yields an elastomer material, adding (F) 0.5 to 30 weight parts epoxy-functional silane coupling agent or its hydrolysis product or its hydrolysis condensation product, (G) 50 to 300 weight parts filler and (H) 0.1 to 2.0 wt % dispersant based on component (G).

By way of a detailed explanation, the essentially straight-chain organopolysiloxane with at least 2 silicon-bonded hydroxyl groups in each molecule, that is, component (A), is crosslinked by component (B) to yield an elastomer. The bonding sites of the hydroxyl groups are unrestricted, but they are preferably at both terminals. The silicon-bonded organic groups are unsubstituted or substituted monovalent hydrocarbon groups and are exemplified by alkyl groups such as methyl, ethyl, propyl, and butyl; alkenyl groups such as vinyl and allyl; aryl groups such as phenyl; aralkyl groups such as benzyl; alkaryl groups such as styryl and tolyl; cycloalkyl groups such as cyclohexyl and cyclopentyl; and these groups in which some or all of the hydrogen atoms have been substituted by halogen, such as fluorine, chlorine and bromine, for example, 3-chloropropyl and 3,3,3-trifluoropropyl. Said organic groups are usually methyl, vinyl and phenyl. The organic groups need not be identical to each other, but may be a combination of different types of organic groups. The molecular structure of this component is essentially straight chain, which means a straight chain or a slightly branched straight chain. The molecular weight is unrestricted, but is desirably 5,000 or greater. A molecular weight of 30,000 or greater generates a satisfactory tensile strength and elongation at break and a molecular weight of 50,000 or greater generates the most advantageous tensile strength and elongation at break. Examples of the instant organopolysiloxanes are dimethylpolysiloxanes, methylphenylpolysiloxanes, dimethylsiloxane-methylphenylsiloxane copolymers, methylvinylpolysiloxanes and dimethylsiloxane-methylvinylsiloxane copolymers, all end-blocked by hydroxyl groups. These organopolysiloxanes can be synthesized by the ring-opening polymerization of organosiloxane cyclics, by the hydrolysis of straight-chain or branched organopolysiloxane containing hydrolyzable groups such as alkoxy or acyloxy groups; or by the hydrolysis of 1 or 2 or more species of diorganodihalosilanes, etc.

Component (B) is the crosslinking agent for component (A). The colloidal silica is either fumed colloidal silica or precipitated colloidal silica and advantageous examples are colloidal silica (particle size, 0.0001 to 0.1 micrometers) stabilized with sodium, ammonia or aluminum ions. The colloidal silica is used at 1 to 150 weight parts and preferably 1.0 to 70 weight parts per 100 weight parts organopolysiloxane comprising component (A).

The alkali metal silicate should be soluble in water and should be dissolved in water before use to produce an aqueous solution. The alkali metal silicates encompass lithium silicate, sodium silicate, potassium silicate and rubidium silicate. Alkali metal silicate is used at 0.3 to 30 weight parts and preferably 0.3 to 20 weight parts per 100 weight parts organopolysiloxane comprising component (A).

The curing catalyst comprising component (C) accelerates the condensation reaction and examples thereof are the metal salts of organic acids such as dibutyltindilaurate, dibutyltindiacetate, tinoctanoate, dibutyltindioctoate, tinlaurate, ferric stannoctanoate, lead octanoate, lead laurate, zinc octanoate; titanate esters such as tetrabutyltitanate, tetrapropyltitanate and dibutoxytitanium bis(ethyl acetoacetate); and amine compounds such as n-hexylamine and guanidine and their hydrochlorides. Before use, the curing catalyst is preferably converted into an emulsion by the usual method using an emulsifier and water.

Component (C) is used at 0.01 to 1.5 weight parts and preferably 0.05 to 1 weight parts per 100 weight parts organopolysiloxane comprising component (A).

The emulsifier comprising component (D) serves mainly to emulsify component (A) and encompasses anionic emulsifiers, nonionic emulsifiers and cationic emulsifiers. Examples of the anionic emulsifiers are higher fatty acid salts, the salts of higher alcohol sulfate esters, alkylbenzenesulfonate salts, alkylnaphthalenesulfonate salts, alkylsulfones and the salts of polyethylene glycol sulfate esters. Examples of the nonionic emulsifiers are polyoxyethylene alkylphenyl ethers, sorbitan fatty acid esters, polyoxyethylene sorbitan fatty acid esters, polyoxyalkylene fatty acid esters, polyoxyethylenepolyoxypropylenes and fatty acid monoglycerides. The cationic emulsifiers are exemplified by aliphatic amine salts, quaternary ammonium salts and alkylpyridinium salts. The emulsifiers are used singly or as mixtures of two or more species. The emulsifier is used at 2 to 30 weight parts per 100 weight parts organopolysiloxane comprising component (A).

The quantity of water comprising component (E) is unrestricted, but must be sufficient to emulsify components (A) through (C) under the effect of component (D).

The epoxy-functional silane coupling agent or hydrolysis product thereof or hydrolysis condensation product thereof comprising component (F) is responsible for adhesion to the surface of porous substrates. Examples are γ-glycidoxypropyltrimethoxysilane,
γ-glycidoxypropylmethyldimethoxysilane,
γ-glycidoxypropyltriethoxysilane,
γ-glyoidoxypropylmethyldiethoxysilane,
β-(3,4-epoxycyclohexyl)ethyltrimethoxysilane,
β-(3,4-epoxycyclohexyl)ethylmethyldimethoxysilane,
β-(3,4-epoxycyclohexyl)ethyltriethoxysilane,
β-(3,4-epoxycyclohexyl)ethylmethyldiethoxysilane,
and the hydrolysis products and hydrolysis condensation products of 1 or two or more of these.

The hydrolysis product or hydrolysis condensation product of the epoxy-functional silane coupling agent may be produced by mixing the epoxy-functional silane coupling agent with water followed by standing for a prescribed period of time. The mixture generates an alcohol and the two layers convert into a single layer. This indicates the production of the hydrolysis product in which all or part of the silicon-bonded alkoxy groups have been converted into hydroxyl groups. In the hydrolysis condensation product, several of the hydrolysis products are condensed with each other to give an oligomer.

Component (F) is used at 0.5 to 30 weight parts per 100 weight parts organopolysiloxane comprising component (A). From the standpoint of homogeneity, component (F) is preferably used as the aqueous solution of the hydrolysis product or hydrolysis condensation product, which is produced by dissolving the epoxy-functional silane coupling agent into a quantity of water approximately equal to or exceeding the quantity of epoxy-functional silane coupling agent proper.

The filler comprising component (G) raises the solids fraction of the base emulsion of components (A) through (E) to convert it into a thick-coat paint film material or into a useful sealing agent. Examples of the fillers are calcium carbonate, clay, aluminum oxide, aluminum hydroxide, quartz, mica, carbon black, graphite, titanium dioxide, zinc oxide and iron oxide.

Particular properties can be imparted to the elastomer by appropriately selecting the filler. For example, the use of calcium carbonate produces a useful 80 wt % solids sealing agent which effectively fills the cracks in wall surfaces and the joints and gaps at the boundaries between walls and columns.

The filler should have an average particle size of 10 micrometers or less. In addition, differences in the particle size distributions of the filler generate large differences in the fluidity and viscosity of the produced emulsion composition. An emulsion composition with the desired elastomer and emulsion properties may be produced by blending several types of fillers.

Component (H) prevents destruction of the emulsion particles by aggregation during the addition of the filler comprising component (G) to the base emulsion of components (A) through (E), as well as after the addition of the filler and during mixing. It prevents the production of an insoluble component with the result that the filler particles are uniformly dispersed. This component is usually known as a protective colloid and its examples are polyphosphate salts such as sodium tripolyphosphate, sodium tetraphosphate, sodium hexametaphosphate, sodium polymetaphosphate and sodium tetrapolyphosphate; formaldehyde condensates of sodium alkylnaphthalenesulfonate; low molecular weight ammonium polyacrylates, low molecular weight styrene-ammonium maleate copolymers; casein; sodium ligninsulfonates or polyvinyl alcohols; sodium polyacrylates; polyvinyl pyrrolidones; glycidyl methacrylates; and cellulose derivatives such as methylcellulose, hydroxyethylcellulose and carboxymethylcellulose. Of these compounds, sodium polyacrylates, glycidyl methacrylates and sodium tetrapolyphosphate are particularly effective. The quantity of addition of component (H) depends on the surface area of the filler, but this quantity is generally 0.1 to 2.0 wt % of the filler comprising component (G). When less than the above is added, its effect is incomplete or completely absent and problems appear such as collapse of the emulsion particles by aggregation, poor dispersion of the filler particles and an insoluble component residue. This component should be added and dissolved into the aqueous silicone emulsion before the filler is added in order to achieve its purpose.

Alternatively, the surface of the filler comprising component (G) is pretreated with the dispersant comprising component (H) and this is added in order to achieve the above purpose. The methods for treating the filler with dispersant can roughly be classified into the following 2 categories: dry methods and wet methods. Either method will produce an advantageous emulsion composition, lacking such problems as aggregative collapse of the emulsion particles, poor dispersion of the filler particles and production of insoluble component, as long as the surface of the filler particles are uniformly coated with dispersant molecules. Preferred dispersants to be used for the surface treatment of filler particles are, in particular, sodium polyacrylates, glycidyl methacrylates and sodium tetrapolyphosphate.

The aqueous silicone emulsion composition of the present invention is produced as follows. The base emulsion composition of components (A) through (E) is first prepared by any of various methods known in the art. For example, hydroxyl-terminated polydimethylsiloxane (component (A)) is emulsified in water (component (E)) with emulsifier (component (D)) using an emulsifying device such as a homomixer, homogenizer or colloid mill and then colloidal silica or alkali metal silicate (component (B)) and curing catalyst (component (C)) are added and mixed. Alternatively, a cyclic organopolysiloxane such as octamethylcyclotetrasiloxane is emulsified in water using the emulsifier, a ring-opening polymerization catalyst is added and polymerization is conducted with heating in order to produce an emulsion of hydroxyl-terminated diorganopolysiloxane. Colloidal silica or alkali metal silicate (component (B)) and curing catalyst (component (C)) are then added and mixed into the resulting emulsion. However, the method used is not limited to the preceding examples. In summary, a base emulsion composition is first produced of 100 weight parts hydroxyl group-containing organopolysiloxane (component (A)), 1 to 150 weight parts colloidal silica or 0.3 to 30 weight parts alkali metal silicate (component (B)), a catalytic quantity of a curing catalyst (component (C)), 20 to 30 weight parts emulsifier (component (D)) and water (component (E)). The pH of the resulting base emulsion composition is then adjusted to 9 to 12. The pH may be adjusted by the addition of an amine such as sodium hydroxide or potassium hydroxide. Organic amines are preferred. In addition to the above examples, the organic amines are exemplified by monoethanolamine, triethanolamine, morpholine and 2-amino-2-methyl-1-propanol. The base emulsion composition is then ripened for a certain period of time. The ripening temperature should not lead to the destruction of the emulsion, that is, it is generally 10° to 95° C. and preferably 15° to 50° C. The ripening period is that period of time until the base emulsion composition yields an elastomeric material when the water is removed. For example, the base emulsion composition will be ripened at 25° C. for 1 week or greater or at 40° C. for 4 days or greater. When the base emulsion composition is insufficiently ripened, a gel is occasionally generated when component (F) is added. After ripening, the epoxy-functional silane coupling agent or its hydrolysis product or its hydrolysis condensation product (component (F)) is added with mixing, component (H) is added with mixing, and component (G) is then added with mixing. Alternatively, a component (G) whose surface has been pretreated with component (H) is added with mixing. The intended aqueous silicone emulsion composition is thus obtained.

The aqueous silicone emulsion composition produced by the method of the present invention may be combined and blended with those components which are generally added and blended into aqueous paints such as fillers, defoaming agents, pigments, dyes, preservatives and penetrants (aqueous ammonia, etc.).

The aqueous silicone emulsion composition produced as above has an excellent stability at room temperature and is cured at room temperature by the removal of the water to give an elastomeric material with excellent bonding to porous substrates in contact with the composition during the curing process. As a result, the aqueous silicone emulsion composition of the present invention is broadly useful as a coating agent or sealing material for porous substrates such as mortar, concrete, slate, ALC, calcium silicate board, wood, stone, and asbestos cloth.

The following examples illustrate the present invention. The parts in the examples are weight parts.

The adhesion was evaluated by an adhesion test in accordance with JIS A5758. That is, a test piece was produced with the configuration shown in FIG. 1. The test piece was cured at 20° C./55% RH for 4 weeks and then tested in a tensile tester. The tensile test was conducted using a Tension UTM-1-2500 under a 20° C. atmosphere and a tension rate of 50 mm/min.

EXAMPLE 1

An emulsion containing component (A) was prepared as follows; 100 Parts hydroxyl-terminated polydimethylsiloxane with 30 siloxane repeat units was mixed with 2 parts sodium lauryl sulfate and 70 parts water, this was passed through an homogenizer twice under 300 kg/cm$^2$, 1 part dodecylbenzenesulfonic acid as polymerization initiator was added and emulsion polymerization was conducted at room temperature for 16 hours. The pH of the product was adjusted to 7 with aqueous sodium hydroxide. An emulsion (emulsion A) was obtained which contained hydroxyl-terminated polydimethylsiloxane with a molecular weight of approximately 200,000.

An emulsion C containing component (C) was prepared by mixing 40 parts dioctyltin dilaurate with 10 parts sodium lauryl sulfate and 40 parts water and then passing this through an homogenizer.

Then, 100 Parts emulsion A was mixed with 1.5 parts emulsion C and 25 parts aqueous silica (40 wt % solids) as component (B), a small amount of diethylamine was added to adjust the pH to 11 and this was then ripened at room temperature for 2 weeks to give the base emulsion. As component (F), a solution was prepared by mixing γ-glycidoxypropyltrimethoxysilane, γ-glycidoxypropylmethyldiethoxysilane or β-(3,4-epoxycyclohexyl)ethyltrimethoxysilane with an equal quantity of water and allowing the solution to stand for 1 day. This was added and mixed into the base emulsion as reported in Table 1. In the comparison examples, γ-aminopropyltriethoxysilane or γ-methacryloxypropyltrimethoxysilane was similarly added and mixed instead of the epoxy-functional silane coupling agent. To increase the solids fraction of the emulsions, 0.5 parts sodium polyacrylate (component (H)) per 100 parts base emulsion and then 100 parts calcium carbonate (1 micrometer average particle size (component (C)) per 100 parts base emulsion were added with mixing. The adhesion of the resulting aqueous silicone emulsion compositions was evaluated and the results are reported in Table 1.

silicone emulsion composition (Sample No. 7) was thus prepared. A test piece as shown in FIG. 1 was prepared and subjected to the adhesion test. In the comparison examples, an aqueous silicone emulsion composition (Sample No. 8) was prepared as above, but omitted the aqueous solution of γ-glycidoxypropyltrimethoxysilane. An aqueous silicone emulsion composition (Sample No. 9) was prepared using untreated calcium carbonate instead of the above-described treated calcium carbonate. Adhesion tests were conducted as above and the results are reported in Table 2. When the aqueous silicone emulsion composition of the present invention is stored at room temperature for 6 months, it does not undergo any change in external appearance or any change in properties. On the other hand, the compari-

TABLE 1

| Sample | | The Present Invention | | | Comparison Examples | | |
|---|---|---|---|---|---|---|---|
| | | 1 | 2 | 3 | 4 | 5 | 6 |
| Composition | | | | | | | |
| base emulsion | (parts) | 100 | 100 | 100 | 100 | 100 | 100 |
| gamma-glycidoxypropyltrimethoxysilane | (parts) | 1 | | | | | |
| gamma-glycidoxypropylmethyldiethoxysilane | (parts) | | 1 | | | | |
| beta-(3,4-epoxycyclohexyl)ethyltrimethoxysilane | (parts) | | | 1 | | | |
| gamma-aminopropyltriethoxysilane | (parts) | | | | 1 | | |
| gamma-methacryloxypropyltrimethoxysilane | (parts) | | | | | 1 | |
| calcium carbonate | (parts) | 100 | 100 | 100 | 100 | 100 | 100 |
| sodium polyacrylate | (parts) | 0.5 | 0.5 | 0.5 | 0.5 | 0.5 | 0.5 |
| Adhesion | | | | | | | |
| state of adhesion | | 100% cohesive failure | 100% cohesive failure | 100% cohesive failure | peeling at interface | peeling at interface | peeling at interface |
| breaking strength | (kg/cm$^2$) | 1.5 | 1.7 | 1.6 | — | — | — |
| 150% modulus | (kg/cm$^2$) | 1.2 | 1.4 | 1.2 | — | — | — |
| elongation | (%) | 340 | 290 | 320 | — | — | — |

EXAMPLE 2

First, 1.5 Parts emulsion C, prepared as in Example 1, and 3 parts sodium silicate was added to 100 parts emulsion A, prepared as in Example 1, and this was mixed to homogeneity. Then 2-amino-2-methyl-1-propanol was added to adjust the pH to 10 followed by ripening at room temperature for 3 weeks to give the base emulsion. A solution was prepared by mixing 2 parts γ-glycidoxypropyltrimethoxysilane into an equal quantity of water followed by standing for 1 day and this was added to the base emulsion. Then 100 parts calcium carbonate with a 0.7 micrometer average particle size and surface-treated with 0.5 wt % sodium tetrapolyphosphate was then added with mixing. An aqueous son aqueous silicone emulsion composition designated as Sample No. 9 had an abnormal external appearance immediately after its preparation due to destruction of the emulsion.

TABLE 2

| Sample | | Present Invention | Comparison Examples | |
|---|---|---|---|---|
| | | 7 | 8 | 9 |
| Composition | | | | |
| base emulsion | (parts) | 100 | 100 | 100 |
| gamma-glycidoxypropyltrimethoxysilane | (parts) | 2 | | 2 |
| calcium carbonate treated with tetrapolyphosphate | (parts) | 100 | 100 | |
| untreated calcium carbonate | (parts) | | | 100 |
| Adhesion | | | | |
| State of Adhesion | | 100% cohesive failure | peeling at interface | 100% cohesive failure |
| breaking strength | (kg/cm$^2$) | 1.5 | — | 1.4 |
| 150% modulus | (kg/cm$^2$) | 1.2 | — | 1.1 |
| elongation | (%) | 350 | — | 350 |

EXAMPLE 3

An aqueous silicone emulsion composition was prepared under the conditions described in Example 1 with the exception that clay with an average particle size of 0.8 micrometers was used in place of the calcium carbonate used in Sample No. 1. The resulting composition, like the composition of Sample No. 1, cured well into an elastomer material and adhered well to ALC.

That which is claimed:

1. A method for producing an aqueous silicone emulsion composition, characterized by producing a base emulsion from
    (A) 100 weight parts of an essentially straight-chain organopolysiloxane with at least 2 silicon-bonded hydroxyl groups in each molecule,
    (B) 1 to 150 weight parts colloidal silica or 0.3 to 30 weight parts alkali metal silicate,
    (C) a catalytic amount of a curing catalyst,
    (D) 2 to 30 weight parts emulsifier and
    (E) water,
and, after adjusting the pH to 9 to 12 and ripening until the removal of water at room temperature yields an elastomer material, adding
    (F) 0.5 to 30 weight parts epoxy-functional silane coupling agent or its hydrolysis product or its hydrolysis condensation product,
    (G) 50 to 300 weight parts filler and
    (H) 0.1 to 2.0 weight percent dispersant based on component (G),
to produce an aqueous silicone emulsion composition which bonds to porous substrates in contact with the emulsion during cure.

2. A method for producing an aqueous silicone emulsion composition as described in claim 1 wherein the surface of filler (G) has been pretreated with dispersant (H).

3. A method for producing an aqueous silicone emulsion composition as described in claim 1 wherein the molecular weight of organopolysiloxane (A) is greater than 30,000.

4. A method for producing an aqueous silicone emulsion composition as described in claim 1 wherein the epoxy-functional silane coupling agent is selected from the group consisting of γ-glycidoxypropyltrimethoxysilane, γ-glycidoxypropylmethyldimethoxysilane, γ-glycidoxypropyltriethoxysilane, γ-glycidoxypropylmethyldiethoxysilane, β-(3,4-epoxycyclohexyl)ethyltrimethoxysilane, β-(3,4-epoxycyclohexyl)ethylmethyldimethoxysilane, β-(3,4-epoxycyclohexyl)ethyltriethoxysilane, β-(3,4-epoxycyclohexyl)ethylmethyldiethoxysilane, and the hydrolysis products and hydrolysis condensation products of one or two or more of these.

5. The aqueous silicone emulsion composition produced by the method of claim 1.